United States Patent
Chiang

(10) Patent No.: US 8,526,425 B2
(45) Date of Patent: Sep. 3, 2013

(54) HOME GATEWAY AND TUNER SHARING METHOD

(75) Inventor: Sheng-Yu Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 12/978,351

(22) Filed: Dec. 23, 2010

(65) Prior Publication Data
US 2012/0099584 A1 Apr. 26, 2012

(51) Int. Cl.
H04L 12/66 (2006.01)
H04N 7/18 (2006.01)
H04N 7/173 (2011.01)

(52) U.S. Cl.
USPC ........... 370/352; 725/114; 725/116; 725/131; 725/80; 725/82

(58) Field of Classification Search
USPC ............... 370/352; 725/80, 82, 98, 131, 114, 725/116
See application file for complete search history.

(56) References Cited

U.S. PATENT DOCUMENTS

| 2007/0050823 A1 | 3/2007 | Lee et al. | |
|---|---|---|---|
| 2009/0210912 A1* | 8/2009 | Cholas et al. | 725/82 |
| 2010/0183306 A1* | 7/2010 | Pangrac et al. | 398/72 |

* cited by examiner

*Primary Examiner* — Asad Nawaz
*Assistant Examiner* — Stephanie Chang
(74) *Attorney, Agent, or Firm* — Altis Law Group, Inc.

(57) ABSTRACT

A home gateway transmits data on the Internet to a plurality of customer premise equipments (CPEs) via a cable modem termination system (CMTS) which connect a plurality of other home gateways. The home gateway distributes a plurality of tuners to the plurality of CPEs according to request packets sent by the plurality of CPEs. The home gateway transmits broadcast packets to the other home gateways to inquire whether one of the other home gateways has an unoccupied tuner or not upon the condition that there are no unoccupied tuners of the home gateway, receives data from the Internet via the unoccupied tuner, and transmits the data to one of the CPEs not distributed the tuner.

8 Claims, 4 Drawing Sheets ical Field

Embodiments of the present disclosure relate to network communication devices, and more particularly to a home gateway and a tuner sharing method.

2. Description of Related Art

A home gateway connects more and more customer premised equipments (CPEs) in a home network, such as, an Internet protocol set-top box (IP STB), a network attached storage (NAS), a personal computer (PC), a mobile phone, and a personal digital assistant (PDA), for example. The home gateway connects the CPEs to a cable modem termination system (CMTS), and communicates with the Internet via the CMTS.

Generally, the home gateway comprises a limited number of tuners that comprise electronic circuits, which provide services for multiple CPEs connected to the home gateway, where each tuner modulates one working frequency of the home gateway to enable the CPE to communicate with the Internet successfully. However, one tuner can only provide services for one CPE at one time. For example, if one home gateway comprises four tuners, the home gateway can provide service for four CPEs at one time. In that case, if the home gateway connects five CPEs, the home gateway cannot meet demands for the five CPE if the five CPEs ask for tuner services from the home gateway at one time.

Currently, a solution is to add more tuners to the home gateway to meet more the demands of the CPEs. However, the solution would add cost and enlarge size of the home gateway by adding more tuners. Therefore, it is a large challenge to provide the home gateway to serve more CPEs under no additional cost of the home gateway.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be supported by any type of computer-readable medium or other storage device. Some or all of the methods may alternatively be embodied in specialized computer hardware or communication apparatus.

Figure 1:
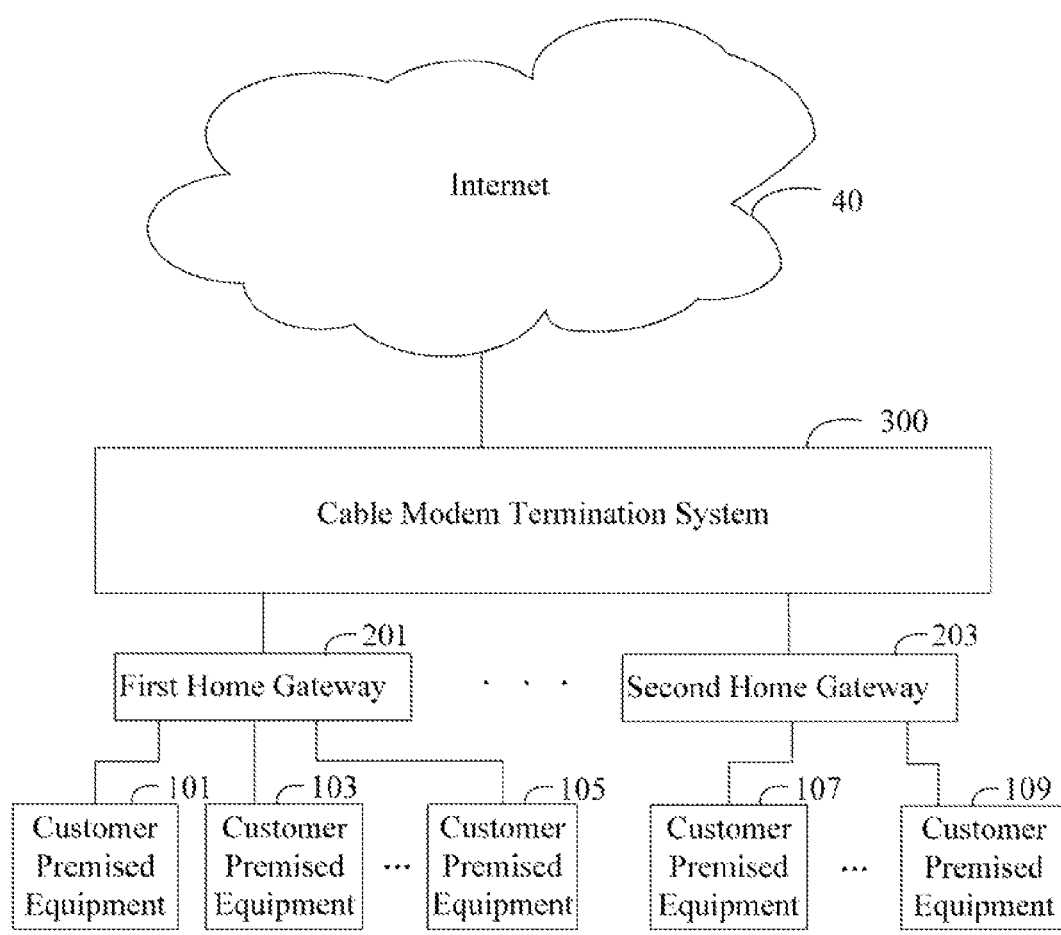
FIG. 1 is a schematic diagram of an application environment of one embodiment of a first home gateway and a second home gateway of the present disclosure.

FIG. 1 is a schematic diagram of an application environment of one embodiment of a first home gateway 201 and a second home gateway 203 of the present disclosure. In one embodiment, each home gateway connects a plurality of customer premised equipments (CPEs), for example, the first home gateway 201 connects the CPEs 101, 103, and 105, the second home gateway 203 connects the CPEs 107 and 109.

Each home gateway is used to establish electronically connection between the CPEs and the Internet 40 via a cable modem termination system (CMTS). The CMTS connects a plurality of home gateways, such as the first home gateway 201 and the second home gateway 203 etc. In one embodiment, the CPE 101, 103, 105, 107, or 109 may be an Internet protocol set top box (IP STB), a network attached storage (NAS), a personal computer (PC), a mobile phone, or a personal digital assistant (PDA).

In one embodiment, the plurality of home gateways connecting to the same CMTS 300 could share tuners among each other to obtain more available tuner resources as well as lower the cost of the home gateway. That is, one home gateway could loan its unoccupied tuner to another home gateway which has no unoccupied tuner. In one embodiment, taking the first home gateway 201 and the second home gateway 203 for example, if the first home gateway 201 has no unoccupied tuner, the second home gateway 203 could loan its unoccupied tuner to the first home gateway 201.

Figure 2:
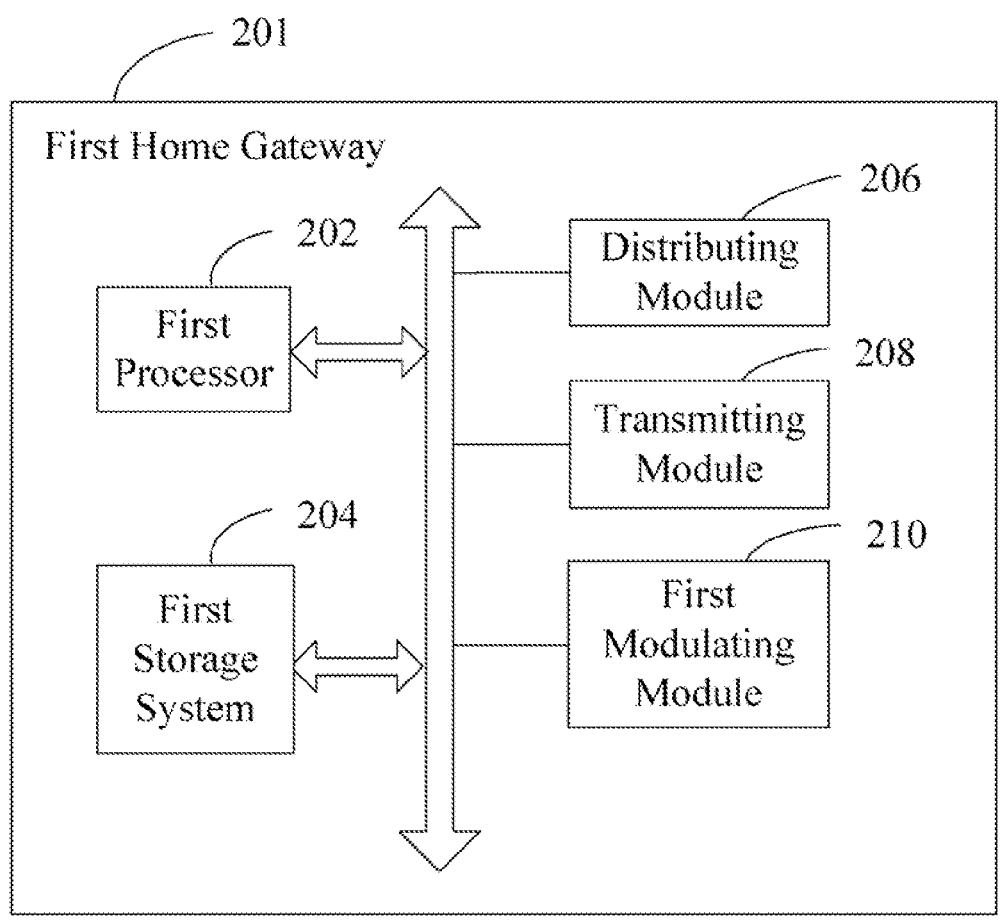
FIG. 2 is a schematic diagram of functional modules of the first home gateway of FIG. 1.

FIG. 2 is a schematic diagram of functional modules of the first home gateway 201 of FIG. 1. In one embodiment, the first home gateway 201 comprises at least one first processor 202, a first storage system 204, a distributing module 206, a transmitting module 208, and a first modulating module 210. The modules 206-208 may comprise computerized codes in the form of one or more programs that are stored in the first storage system 204. The computerized code comprises instructions that are executable by the at least one first processor 202 to realize functions of the modules 206-208.

Figure 3:
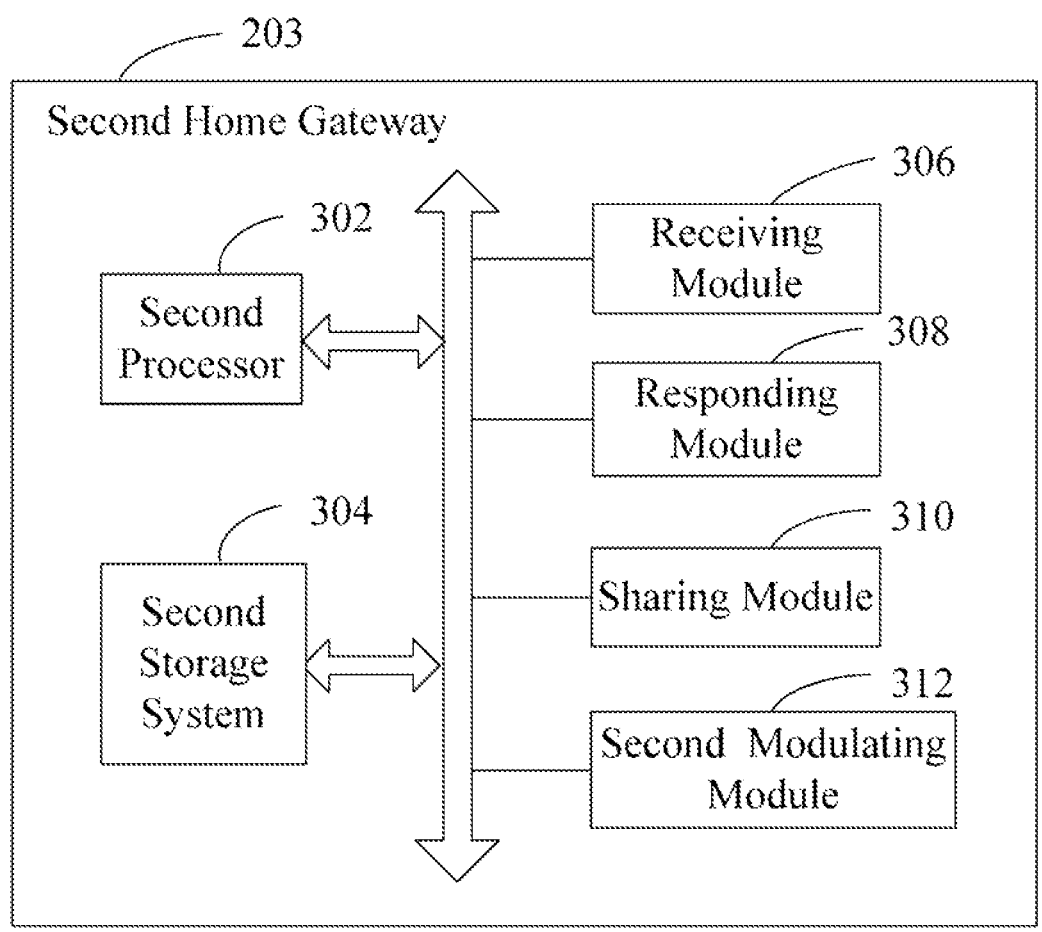
FIG. 3 is a schematic diagram of functional modules of the second home gateway of FIG. 1.

FIG. 3 is a schematic diagram of functional modules of the second home gateway 203 of FIG. 1. In one embodiment, the second home gateway 203 comprises at least one second processor 302, a second storage system 304, a receiving module 306, a responding module 308, a sharing module 310, and a second modulating module 312. The modules 306-310 may comprise computerized codes in the form of one or more programs that are stored in the second storage system 304. The computerized code comprises instructions that are executable by the at least one second processor 302 to realize functions of the modules 306-310.

In one embodiment, both the first modulating module 210 and the second modulating module 312 comprise a plurality of tuners composed by electronic circuit. Each tuner in either home gateway (201 or 203, for example) is used to modulate a working frequency of corresponding home gateway to establish communication between one of the CPEs 101-109 and the Internet 40.

In one embodiment, upon the condition that the first home gateway 201 lacks available tuners and the second home gateway 203 has at least one unoccupied tuner, the first home gateway 201 transmits request for sharing the unoccupied tuners to the second home gateway 203. Upon receiving the request, the second home gateway 203 responds the request to loan its unoccupied tuners to the first home gateway 201. In another embodiment, either the first home gateway 201 or the second home gateway 203 may comprise not only the processor, the storage system, and the modulating module, but also the distributing module 206, the transmitting module 208, the receiving module 306, the responding module 308, and the sharing module 310 for transmitting and responding the request.

The distributing module 206 distributes the plurality of tuners in the first home gateway 201 to the CPEs 101-109 according to request packets sent by the CPEs 101-109 respectively. For example, if the CPEs 101, 103, and 105 are need to communicate with the Internet 40, then the CPEs 101, 103, and 105 transmit the request packets to the first home gateway 201 to ask for needed tuners, and subsequently the distributing module 206 distributes the needed tuners of each of the CPEs 101, 103, and 105. In the embodiment, one tuner is only distributed to one CPE at one time.

The transmitting module 208 determines if the first home gateway 201 has no unoccupied tuners. In one embodiment, if the first modulating module 210 of the first home gateway 201 comprises two tuners, the distributing module 206 can distribute the two tuners to two CPEs at one time. In that case, if the CPEs 101, 103, and 105 connected to the first home gateway 201 all transmit the request packets to the first home gateway 201 for obtaining the tuners at one time, the tuners are not enough and the transmitting module 208 determines the first home gateway 201 has no unoccupied tuners.

If the transmitting module 208 determines the first home gateway 201 has no unoccupied tuners, the transmitting module 208 transmits broadcast packets to the other home gateways to inquire whether one or more of the other home gateways, such as the second home gateway 203, has unoccupied tuners. In one embodiment, the broadcast packet comprises an Internet protocol (IP) address of the first home gateway 201, and a special working frequency that one of the CPEs asks for.

For example, the first home gateway 201 communicates with the CPEs 101, 103, and 105, and comprises only two tuners in the first modulating module 210. The CPEs 101, 103, and 105 communicate with the Internet 40 with working frequencies of 100 MHz, 108 MHz, and 116 MHz, respectively. In that case, if the CPEs 101, 103, and 105 want to communicate with the Internet 40 simultaneously, then the CPEs 101, 103, and 105 transmit the request packets to the first home gateway 201 to obtain the tuners firstly.

As the first modulating module 210 only has two tuners, at least one of the CPEs 101-105 cannot obtain the needed tuner. In that case, the transmitting module 208 determines the first home gateway 201 has no unoccupied tuners, and transmits broadcast packets to the other home gateways to inquire whether one or more of the other home gateways, such as the second home gateway 203, has unoccupied tuners. In one embodiment, the broadcast packet comprises the IP address of the first home gateway 201, and the special working frequency that one of the CPEs asks for, such as 100 MHz, 108 MHz, or 116 MHz.

The receiving module 306 of the second home gateway 203 receives the broadcast packets from the first home gateway 201. In one embodiment, the broadcast packet is used to ask whether one of the other home gateways, such as the second home gateway 203, has at least one unoccupied tuner.

The responding module 308 of the second home gateway 203 determines whether the second home gateway 203 has the unoccupied tuner currently.

If the responding module 308 determines the second home gateway 203 has the unoccupied tuner currently, the responding module 308 transmits responding packets to the first home gateway 201 based on the IP address of the first home gateway 201. In one embodiment, the responding packet aims to inform the first home gateway 201 to receive data from the second home gateway 203, and comprises the IP address of the second home gateway 203.

The sharing module 310 in the second home gateway 203 turns on the unoccupied tuner, modulates one of the working frequencies of the second home gateway 203 to the special working frequency to receive the data from the Internet 40, and transmits the data to the first home gateway 201.

For example, if the CPE 101 connected to the first home gateway 201 has not been assigned the tuner, then first home gateway 201 transmits the broadcast packets to the second home gateway 203 for asking distributing the unoccupied tuner. As the CPE 101 communicates with the Internet 40 with the working frequency of 100 MHz, the sharing module 310 turns on the unoccupied tuner, and modulates one of the working frequencies of the second home gateway 203 to 100 MHz to receive the data from the Internet 40 when the second home gateway 203 receives the broadcast packets and determines there is at least one unoccupied tuner currently.

In one embodiment, the second home gateway 203 transmits the data to the first home gateway 201 via the CMTS 300.

The transmitting module 208 of the first home gateway 201 receives the data from the second home gateway 203 via the CMTS 300, and transmits the data to one of the CPEs 101-105 which is not assigned the tuner by the first home gateway 201 and shares the unoccupied tuner of other home gateways.

Figure 4:
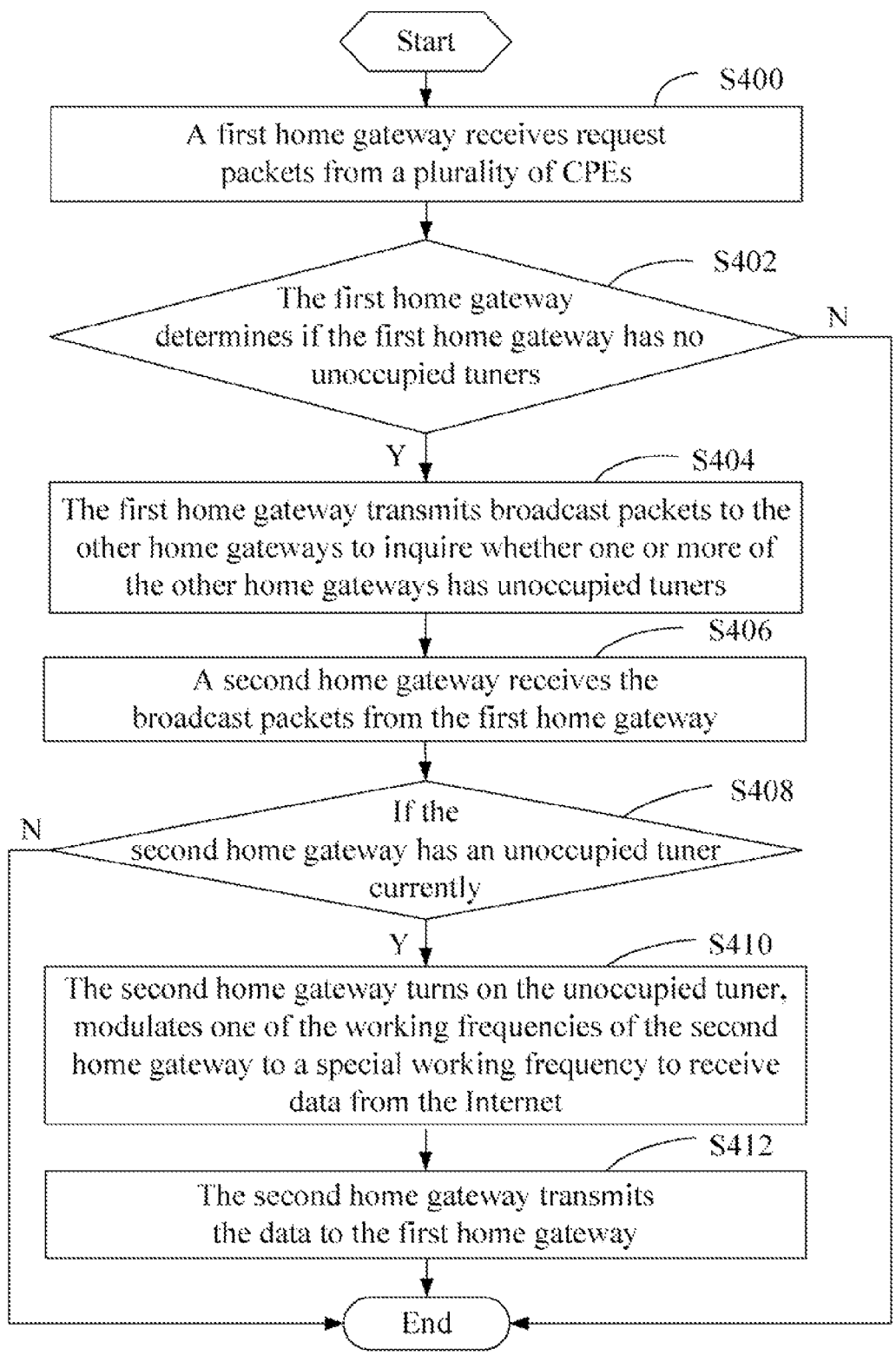
FIG. 4 is a flowchart of a tuner sharing method among a plurality of home gateway of the present disclosure.

FIG. 4 is a flowchart of a tuner sharing method among the plurality of home gateways of the present disclosure. The flowchart is executed by the modules of FIG. 2 and FIG. 3. Depending on the embodiment, additional blocks may be added, others deleted, and the ordering of blocks may be changed while remaining well within the scope of the disclosure.

In block S400, the distributing module 206 of the first home gateway 201 receives the request packets from the CPEs 101-109, and distributes the plurality of tuners to the CPEs 101-109 according to the request packets. For example, if the CPEs 101, 103, and 105 are need to communicate with the Internet 40, then the CPEs 101, 103, and 105 transmit the request packets to the first home gateway 201 to ask for needed tuners, and subsequently the distributing module 206 distributes the needed tuners of each of the CPEs 101, 103, and 105. In the embodiment, one tuner is only distributed to one CPE at one time.

In block S402, the transmitting module 208 of the first home gateway 201 determines if the first home gateway 201 has no unoccupied tuners. In one embodiment, if the first modulating module 210 of the first home gateway 201 comprises two tuners, the distributing module 206 can distribute the two tuners to two CPEs at one time. In that case, if the CPEs 101, 103, and 105 connected to the first home gateway 201 all transmit the request packets to the first home gateway 201 for obtaining the tuners at one time, the tuners are not enough and the transmitting module 208 determines the first home gateway 201 has no unoccupied tuners.

If the transmitting module 208 determines the first home gateway 201 has no unoccupied tuners, in block S404, the transmitting module 208 transmits broadcast packets to the other home gateways to inquire whether one or more of the other home gateways, such as the second home gateway 203, has unoccupied tuners. In one embodiment, the broadcast packet comprises the IP address of the first home gateway 201, and a special working frequency that one of the CPEs asks for.

In block S406, the receiving module 306 of the second home gateway 203 receives broadcast packets from the first home gateway 201. In one embodiment, the broadcast packet is used to ask whether one of the other home gateways, such as the second home gateway 203, has at least one unoccupied tuner.

In block S408, the responding module 308 of the second home gateway 203 determines whether the second home gateway 203 has the unoccupied tuner currently.

If the responding module 308 of the second home gateway 203 determines the second home gateway 203 has the unoccupied tuner currently, the responding module 308 transmits responding packets to the first home gateway 201 based on the IP address of the first home gateway 201. In one embodiment, the responding packet aims to inform the first home gateway 201 to receive data from the second home gateway 203, and comprises the IP address of the second home gateway 203.

In block S410, the sharing module 310 of the second home gateway 203 turns on the unoccupied tuner, modulates one of the working frequencies of the second home gateway 203 to the special working frequency to receive the data from the Internet 40.

In block S412, the sharing module 310 of the second home gateway 203 transmits the data to the first home gateway 201. In one embodiment, the transmitting module 208 of the first home gateway 201 receives the data from the second home gateway 203 via the CMTS 300, and transmits the data to one of the CPEs 101-105 which is not assigned the tuner by the first home gateway 201 and shares the unoccupied tuner of other home gateways.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A home gateway that electronically connects a plurality of customer premise equipments (CPEs) to the Internet via a cable modem termination system (CMTS) connecting to a plurality of other home gateways, the home gateway comprising:
   at least one processor;
   a storage system;
   a plurality of tuners operable to modulate working frequencies of the home gateway to establish communication between the plurality of CPEs and the Internet; and
   one or more programs that are stored in the memory and are executed by the at least one processor, the one or more programs comprising:
      a distributing module operable to distribute the plurality of tuners to the plurality of CPEs according to request packets sent by the plurality of CPEs;
      a transmitting module operable to transmit broadcast packets to the other home gateways to inquire whether one of the other home gateways has an unoccupied tuner or not upon the condition that there are no unoccupied tuners of the home gateway, to receive response packets from the one of the other home gateways having the unoccupied tuner, to modulate a special working frequency to receive data from the Internet via the unoccupied tuner, and to transmit the data to the CPE that has not distributed the tuner; and
      wherein the broadcast packet comprises the special working frequency asked by one of the CPEs, and the response packet comprises an Internet protocol (IP) address of the one of the other home gateways having the unoccupied tuner.

2. The home gateway as claimed in claim 1, wherein the transmitting module is further operable to receive the data from the unoccupied tuner according to the IP address in the response packet.

3. A home gateway that electronically connects a plurality of customer premise equipments (CPEs) to the Internet via a cable modem termination system (CMTS) connecting a plurality of other home gateways, the home gateway comprising:
   at least one processor;
   a storage system;
   a plurality of tuners operable to modulate working frequencies of the home gateway to establish communication between the plurality of CPEs and the Internet; and
   one or more programs that are stored in the memory and are executed by the at least one processor, the one or more programs comprising:
      a receiving module operable to receive broadcast packets from the other home gateways for asking whether one of the plurality of tuners is unoccupied;
      a responding module operable to transmit responding packets to one of the other home gateways transmitting the broadcast packets if one of the plurality of tuners is unoccupied;
      a sharing module operable to turn on the unoccupied tuner, to modulate a special working frequency to receive data from the Internet, and to transmit the data to the one of the other home gateways transmitting the broadcast packets; and
      wherein the broadcast packets comprises an Internet protocol (IP) address of the one of the other home gateways transmitting the broadcast packets, and the special frequency asked by one of the CPEs.

4. The home gateway as claimed in claim 3, wherein the sharing module is further operable to transmit the data to the one of the other home gateways transmitting the broadcast packets according to the IP address in the broadcast packets.

5. A home gateway that electronically connects a plurality of customer premise equipments (CPEs) to the Internet via a cable modem termination system (CMTS) connecting to a plurality of other home gateways, the home gateway comprising:
   at least one processor;
   a storage system;
   a plurality of tuners operable to modulate working frequencies of the home gateway to establish communication between the plurality of CPEs and the Internet; and
   one or more programs that are stored in the memory and are executed by the at least one processor, the one or more programs comprising:
      a distributing module operable to distribute the plurality of tuners to the plurality of CPEs according to request packets sent by the plurality of CPEs;
      a transmitting module operable to transmit broadcast packets to the other home gateways to inquire whether one of the other home gateways has an unoccupied tuner or not upon the condition that there are no unoccupied tuners of the home gateway, to receive response packets from the one of the other home gateways having the unoccupied tuner, to modulate a special working frequency to receive data from the Internet via the unoccupied tuner, and to transmit the data to the CPE that has not distributed the tuner, wherein the broadcast packet comprises the special working frequency asked by one of the CPEs, and the response packet comprises an Internet protocol (IP) address of the one of the other home gateways having the unoccupied tuner;
      a receiving module operable to receive broadcast packets from the other home gateways for asking whether one of the plurality of tuners is unoccupied;
      a responding module operable to transmit responding packets to one of the other home gateways transmitting the broadcast packets if one of the plurality of tuners is unoccupied; and
      a sharing module operable to turn on the unoccupied tuner, to modulate the special working frequency to receive data from the Internet, and to transmit the data to the one of the other home gateways transmitting the broadcast packets.

6. A tuner sharing method between a first home gateway and a second home gateway, the first home gateway and the second home gateway connecting to a plurality of customer premise equipments (CPEs), and each comprising a plurality of tuners, the tuner sharing method comprising:

the first home gateway receiving request packets from the plurality of CPEs connected to the first home gateway for asking distributing the plurality of tuners, and distributes the plurality of tuners of the first home gateway to the plurality of CPEs connected to the first home gateway according to the request packets;

the first home gateway transmitting broadcast packets to the second home gateway to inquire whether the second home gateway has an unoccupied tuner if the first home gateway has no unoccupied tuners;

the second home gateway receiving the broadcast packet from the first home gateway, and turns on the unoccupied tuner of the second home gateway to modulate a special working frequency to receive data from the Internet;

the second home gateway transmitting the data to the first home gateway;

the first home gateway transmitting the data sent by the second home gateway to one of the CPEs that has not distributed the tuner; and wherein the broadcast packet comprises the special working frequency asked by one of the CPEs.

7. The tuner sharing method as claimed in claim 6, further comprising:

the second home gateway determines whether the second home gateway has the unoccupied tuner currently; and the second home gateway transmits response packets to the first home gateway if the second home gateway has the unoccupied tuner currently.

8. The tuner sharing method as claimed in claim 7, wherein the response packets comprises an Internet protocol (IP) address of the second home gateway, and the first home gateway receives the data from the second home gateway according to the IP address of the second home gateway.

* * * * *